United States Patent
Smith et al.

(10) Patent No.: US 8,394,179 B2
(45) Date of Patent: Mar. 12, 2013

(54) METHOD OF TREATING A GAS STREAM

(75) Inventors: James Robert Smith, Taunton (GB); Gary Peter Knight, Bristol (GB)

(73) Assignee: Edwards Limited, Crawley, West Sussex (GB)

( * ) Notice: Subject to any disclaimer, the term of this patent is extended or adjusted under 35 U.S.C. 154(b) by 342 days.

(21) Appl. No.: 12/526,485

(22) PCT Filed: Jan. 23, 2008

(86) PCT No.: PCT/GB2008/050045
§ 371 (c)(1),
(2), (4) Date: Dec. 1, 2009

(87) PCT Pub. No.: WO2008/099206
PCT Pub. Date: Aug. 21, 2008

(65) Prior Publication Data
US 2010/0101414 A1   Apr. 29, 2010

(30) Foreign Application Priority Data
Feb. 14, 2007  (GB) .................................. 0702837.6

(51) Int. Cl.
*B01D 53/14*  (2006.01)
(52) U.S. Cl. ............... 95/219; 95/233; 95/235; 96/267; 96/301; 96/355; 422/168; 422/182; 422/183; 423/210
(58) Field of Classification Search ............ 95/156, 95/57, 216–219, 233, 235, 64–65; 96/15, 96/52, 181, 267–268, 272, 274, 281; 422/168, 422/184.01, 186.04; 204/157.3
See application file for complete search history.

(56) References Cited

U.S. PATENT DOCUMENTS

| | | | | | |
|---|---|---|---|---|---|
| 4,001,332 | A | * | 1/1977 | Mau et al. | 568/302 |
| 5,178,823 | A | * | 1/1993 | Hughes | 376/310 |
| 5,365,634 | A | * | 11/1994 | Hughes | 15/366 |
| 5,405,445 | A | * | 4/1995 | Kumada et al. | 118/719 |
| 5,817,284 | A | * | 10/1998 | Nakano et al. | 423/240 S |
| 6,083,572 | A | * | 7/2000 | Theil et al. | 427/573 |
| 6,800,210 | B2 | * | 10/2004 | Patel et al. | 216/2 |
| 7,740,815 | B2 | * | 6/2010 | Smith et al. | 423/210 |
| 2001/0008618 | A1 | * | 7/2001 | Comita et al. | 423/210 |
| 2003/0103883 | A1 | * | 6/2003 | Mori | 423/210.5 |
| 2004/0191146 | A1 | | 9/2004 | Shinohara et al. | |
| 2006/0057045 | A1 | * | 3/2006 | Sasaki et al. | 423/210 |

FOREIGN PATENT DOCUMENTS

| | | | |
|---|---|---|---|
| DE | 3024352 A1 | | 1/1982 |
| EP | 1023932 A1 | * | 1/2000 |
| GB | 1243080 A2 | | 8/1971 |
| JP | 01-293120 | * | 11/1989 |

(Continued)

*Primary Examiner* — Duane Smith
*Assistant Examiner* — Ives Wu

(57) ABSTRACT

A method is described for treating a gas stream containing a flammable gas, such as hydrogen or a hydrocarbon gas. The gas stream is conveyed to a liquid ring pump (18), to which a gaseous oxidant and water are supplied. The water and the gas stream are discharged from the pump (18), with the discharged gas stream being subsequently separated from the liquid, and conveyed to a pyrolysis device (42) for pyrolysing the flammable gas and the oxidant. Any particulates and acidic species within the gas stream are retained by the water within the liquid ring pump to inhibit corrosion or blockage of the pyrolysis device (42). A filter or other device (40) may be provided to remove water from the gas stream before it enters the pyrolysis device (42).

25 Claims, 1 Drawing Sheet

FOREIGN PATENT DOCUMENTS

| | | |
|---|---|---|
| JP | 11333247 A | 12/1999 |
| WO | 0218032 A2 | 3/2002 |
| WO | 0218032 A3 | 3/2002 |
| WO | 02062452 A2 | 8/2002 |
| WO | 2006008521 A1 | 1/2006 |
| WO | WO 2006/008521 * | 1/2006 |
| WO | WO 2006/008521 A1 * | 1/2006 |
| WO | WO-2006008512 A1 * | 1/2006 |
| WO | 2006100432 A1 | 9/2006 |
| WO | WO 2006100432 * | 9/2006 |

* cited by examiner

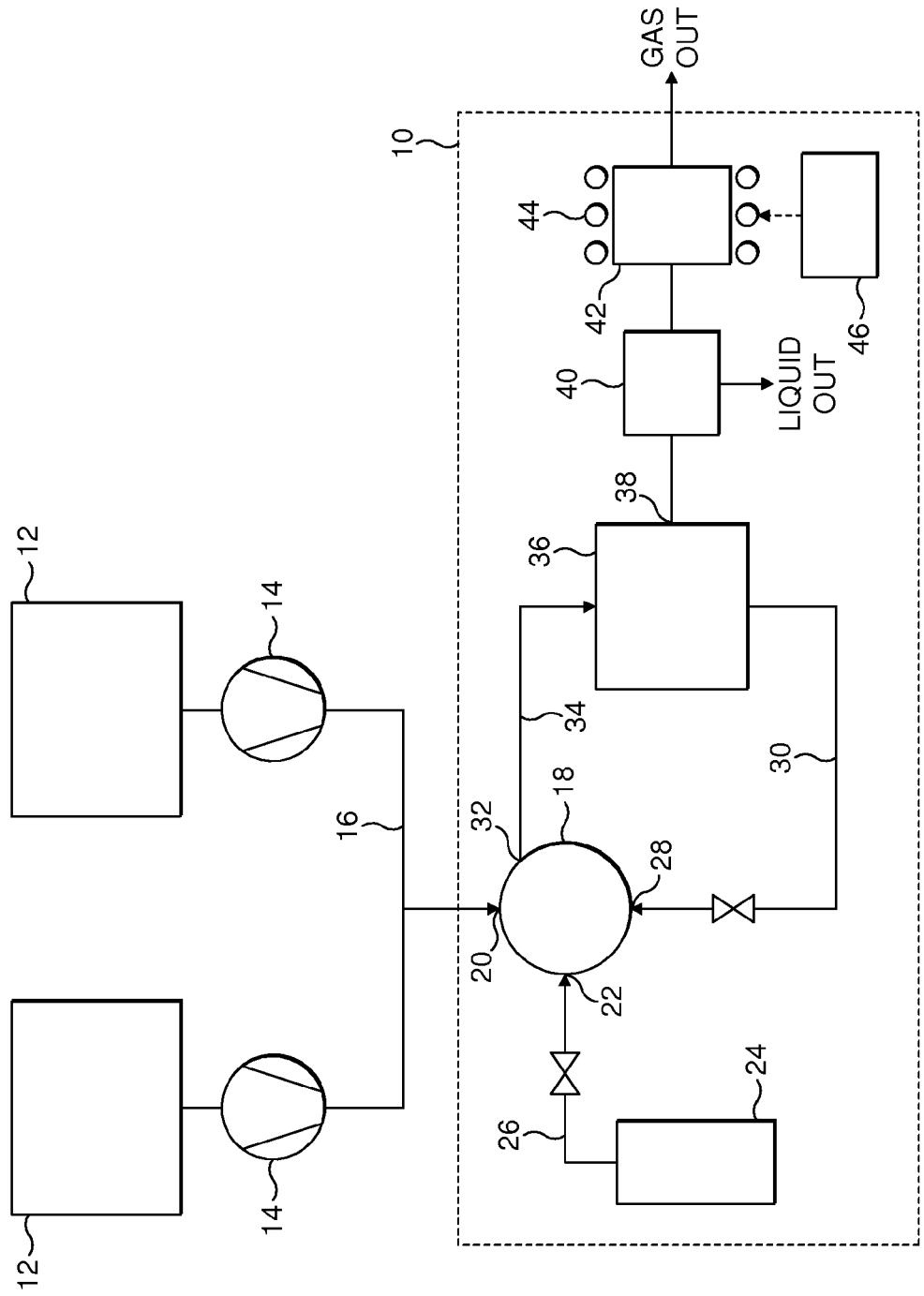

METHOD OF TREATING A GAS STREAM

FIELD OF THE INVENTION

The present invention relates to a method of, and apparatus for, treating a gas stream.

BACKGROUND

Many semiconductor manufacturing processes use or generate flammable gases. For example, epitaxial deposition processes conducted within a processing chamber may utilize a silicon source gas, typically silane or one of the chlorosilane compounds, in a hydrogen atmosphere at high temperature, typically around 800-1100° C., and under a vacuum condition. Silane and ammonia may be supplied to a process chamber to form a thin film of silicon nitride on a substrate. As another example, a fuel gas may be added to a gas mixture used to etch a dielectric film.

A process tool typically has a plurality of process chambers, each of which may be at respective different stage in a deposition, etching or cleaning process, and so the gas being exhaust from the chambers at any given time may have various different compositions. In such processes, only a small proportion of the gases is consumed and so the majority of the gases supplied to the chambers is exhausted from the chambers together with solid and gaseous by-products from the processes.

The exhaust system for drawing the exhaust gases from the process chambers typically comprises a plurality of secondary pumps, each for drawing gas from a respective process chamber, and at least one primary pump backing the secondary pumps. Consequently, the exhaust gas streams drawn from the process chambers tend to be combined within a manifold or other connected piping within the exhaust system, bringing together the process gases and by-products from a number of different processes.

Whilst the combined exhaust gas itself tends not to be flammable, the pumping of such gases requires great care to be placed on the leak integrity of the exhaust system to ensure that there is no ingress of air. If the exhaust gas is above its lower explosive limit (LEL), any ignition sources within the exhaust system could result in the generation of hazardous flame fronts travelling through the exhaust system.

A common technique used to avoid ignition of a flammable gas stream is to introduce into the gas stream an excess of an inert purge gas, typically nitrogen. Vacuum pumps used in the exhaust systems connected to semiconductor processing chambers have historically been either oil filled pumps or multi-stage dry pumps. However, these pumps have a limited capability to take additional purge gas into their final stages to facilitate dilution of exhaust gas to a level below which an addition of an oxidising gas to the exhaust gas would be unable to raise the exhaust gas above its LEL.

Whilst a device may be provided in the exhaust system for controllably pyrolysing or otherwise removing any flammable gases contained within the exhaust gas, the presence of corrosive, acidic species in the exhaust gas can significantly reduce the lifetime and efficiency of the pyrolysing device. For example, acidic gases such as HF or HCl may be generated as by-products from a process conducted in the process chamber, and etching gases supplied to a process chamber may include halocompounds such as HCl, HBr, $BCl_3$, $Cl_2$ and $Br_2$, and combinations thereof.

SUMMARY

The present invention provides a method of treating a gas stream comprising first and second gaseous components, the method comprising the steps of:

conveying the gas stream to a liquid ring pump;
supplying to the pump a liquid for forming a liquid ring in the pump and for removing the first gaseous component from the gas stream;
exhausting the liquid and the gas stream from the pump;
separating the gas stream from the liquid; and
subsequently removing the second gaseous component from the gas stream.

Corrosion or blockage of a device for removing a gaseous component from the gas stream can be inhibited by the retention of any particulates and gaseous acidic species present within the gas stream by the liquid within the liquid ring pump. Examples of acidic species which may be present in the gas stream include sulphur-containing species, such as $SO_2$, and halogen-containing species, such as HF, HCl, $BCl_3$, HBr, $Cl_2$ and $Br_2$. Examples of a suitable liquid for forming a liquid ring in the pump and removing a gaseous acidic species from the gas stream include water, an aqueous solution, a solution of a thiosulphate and a caustic soda solution. The use of a device downstream from the pump for removing a hazardous or flammable gas from the gas stream can thus be realised without impact from the presence of such particulates and acidic species on the lifetime and efficiency of such a device.

Furthermore, the increased gas capacity of liquid ring pumps in comparison to multi-stage vacuum pumps and oil filled pumps can enable larger flows of diluent purge gas to be added to the gas stream.

A pyrolysis device may be used for pyrolysing a flammable gas located in the gas stream separated from the liquid. The flammable gas may be any flammable gas, and examples include hydrocarbons, such as $C_2H_2$, $C_2H_4$, $CH_2F_2$ and $CH_3F$, CO, $H_2$, $NH_3$. A filter, cyclone or other gas treatment device may be provided for removing any water from the gas stream following separation from the liquid, as any moisture present in the gas stream could otherwise poison or wash away components of the pyrolysis device. For example, the pyrolysis device may comprise a pyrolysis catalyst, such as Hopcalite from Molecular Products, which may be at least initially heated to inhibit the condensation of water within the pyrolysis device. As heat will be generated within the device during the pyrolysis of the flammable gases within the gas stream, the degree of external heating of the device may be gradually reduced or eliminated during treatment of the gas stream. The pyrolysis device may alternatively comprise a heated high surface area material, or other heated device suitable for performing pyrolysis.

As an alternative to, or in addition to, a pyrolysis device, a plasma abatement device, combustion apparatus, a gas reactor column, or any other gas treatment device may be provided for removing a gaseous component of the gas stream exhausted from the liquid ring pump. This gaseous component may also be a flammable gas, or it may be a perfluorinated compound, such as $CF_4$, or other gas which is not removed by the liquid within the liquid ring pump.

The addition of a stream of purge gas such as air into the gas stream can introduce ample gaseous oxidant into the gas stream for reaction with the flammable gas, rendering the gas stream safe from subsequent fire or explosion. This gaseous oxidant may be supplied directly to the pyrolysis and/or plasma abatement device, or it may supplied to the gas stream upstream for this device. For example, the gaseous oxidant may be supplied to an inlet of the liquid ring pump.

A preferred embodiment of the present invention is directed to the treatment of a gas stream containing a flammable gas, and so the present invention also provides a method of treating a gas stream containing a flammable gas, the method comprising the steps of:

conveying the gas stream to a liquid ring pump;
supplying to the pump a liquid for forming a liquid ring in the pump;
exhausting the liquid and the gas stream from the pump;
separating the gas stream from the liquid; and
pyrolysing the flammable gas within the gas stream separated from the liquid.

The present invention also provides apparatus for treating a gas stream containing first and second gaseous components, the apparatus comprising:
a liquid ring pump for receiving the gas stream;
means for supplying to the pump a liquid for forming a liquid ring within the pump and for removing the first gaseous component from the gas stream, the pump comprising an outlet for exhausting the liquid and the gas stream from the pump;
separating means for separating the gas stream from liquid exhausted from the pump; and
means located downstream from the separating means for removing the second gaseous component from the gas stream.

The present invention further provides apparatus for treating a gas stream containing a flammable gas, the apparatus comprising:
a liquid ring pump for receiving the gas stream;
means for supplying to the pump a liquid for forming a liquid ring within the pump, the pump comprising an outlet for exhausting the liquid and the gas stream from the pump;
separating means for separating the gas stream from liquid exhausted from the pump; and
means located downstream from the separating means for pyrolysing the flammable gas within the gas stream.

In a preferred embodiment, a first gas inlet is provided at the inlet side of the liquid ring pump so that the gas stream containing the flammable gas is pulled into the spaces between adjacent rotor blades where the liquid is moving radially outward. A second gas inlet may be provided at the inlet side of the pump for conveying the gaseous oxidant to the housing of the pump. A further inlet for supplying the liquid for forming the liquid ring within the housing may be provided at the bottom of the housing, between the inlet and outlet sides of the pump.

Features described above in relation to method aspects of the invention are equally applicable to apparatus aspects, and vice versa.

DETAILED DESCRIPTION

The present invention will now be described, by way of example only, with reference to the accompanying drawing which illustrates an embodiment of an apparatus 10 for treating a gas stream. In this embodiment, the apparatus 10 is used to treat gas streams exhausted from one or more process chambers 12 of a process tool. For simplicity only, two process chambers 12 are illustrated in the drawing, although the apparatus 10 may be used to treat gas streams exhausted from any number of process chambers 12. During use, process gases are supplied to the process chambers for the processing of substrates located within the chambers 12, or for chamber cleaning between processing steps. These processes may include deposition and etching processes conducted on the substrates, for example during the formation of a semiconductor, flat panel display or solar device.

As dissimilar processes or cleaning processes may be conducted within the chambers 12 at any given time, the exhaust gases drawn from the chambers 12 by secondary vacuum pumps 14, which may be multi-stage dry pumps or molecular pumps, may have varying components, made up from unconsumed process and cleaning gases, and by-products from reactions occurring within the chambers 12. These exhaust gases may comprise one or more flammable gases, for example, a hydrocarbon such as $C_2H_2$, $C_2H_4$, $CH_2F_2$ or $CH_3F$, CO, $H_2$, or $NH_3$, supplied to the chambers 12 as process gases themselves or as carrier gases for other process gases The exhaust gases may also comprise solid particulates, such as $SiO_2$ particles, generated within the process chambers 12, together with corrosive, acidic gases, such as $SO_2$ or one of the halogenated species HF, HCl, $BCl_3$, HBr, $Cl_2$ and $Br_2$, which may be either unconsumed process gases or by-products from the processing performed in the process chambers 12.

The gas streams exhausted from the secondary vacuum pumps 14 are combined at manifold 16, and conveyed to the apparatus 10. As illustrated in the drawing, the apparatus 10 comprises a liquid ring pump 18 having a first inlet 20 through which the combined gas stream enters the liquid ring pump 18. The liquid ring pump 18 includes a second inlet 22 located adjacent the first inlet 20 on the inlet side of the liquid ring pump 18. A source 24 of a gaseous oxidant is connected to the second inlet 22 by a conduit system 26, which supplies the oxidant to the liquid ring pump 18. The source 24 may conveniently comprise a source of air, containing oxygen as the gaseous oxidant. The gaseous stream containing the oxidant is supplied to the pump 18 so that the pressure at the first inlet 20 is preferably in the range from 50 to 500 mbar, more preferably in the range from 80 to 120 mbar.

The liquid ring pump 18 further includes a third inlet 28 through which liquid for forming a liquid ring within the pump 18 is conveyed by conduit system 30. In this embodiment, the liquid is water, although any aqueous solution may be used. As is known, the liquid ring pump 18 comprises a rotor rotatably mounted in an annular housing such that the rotor axis is eccentric to the central axis of the housing. The rotor has blades that extend radially outwardly therefrom and are equally spaced around the rotor. With rotation of the rotor, the blades engage the liquid and form it into an annular ring inside the housing. The waste stream entering the liquid ring pump 18 through the first inlet 20, and the air stream entering the liquid ring pump 18 through the second inlet 22, are pulled into spaces between adjacent blades, and are conveyed about the pump 18 to the pump outlet 32.

Any solid particulates contained within the gas stream entering the liquid ring pump 18 become entrained within the liquid inside the pump 18. Furthermore, a significant proportion of the corrosive, acidic gases within this gas stream are taken into solution by the liquid, thereby significantly reducing the amount of these gases within the gas stream. For example, instead of using water as the liquid supplied to the pump 18, a caustic soda solution may be supplied to the pump 18 to both form the liquid ring in the pump and remove $Cl_2$ and/or $Br_2$ from the gas stream. Alternatively, a solution of a thiosulphate may be supplied to the pump 18 to perform the dual roles of forming a liquid ring in the pump and removing a gaseous component from the gas stream.

The acidic, and particulate-laden, liquid is exhausted from the pump 18 through the outlet 32, together with non-dissolved gases, including the gaseous oxidant supplied to the pump 18 and flammable gases contained within the gas stream that entered the pump 18 through the first inlet 20. This mixture of gas and liquid is conveyed by conduit system 34 to a fluid reservoir 36, which serves to separate the gas stream from the liquid. The gas is exhausted from the reservoir 36 through outlet 38, whilst the collected liquid can be conveyed back to the third inlet 28 of the liquid ring pump 18 by the conduit system 30. Filters (not shown) or the like may be used to remove the solid particulates from the liquid, whilst an ion-exchange apparatus or the like may be provided to remove the acidic components from the liquid before it is returned to the liquid ring pump 18. Whilst a fluid reservoir 36 is used in this example, any other separating device suitable for separating the gas stream from the liquid may be used.

The gas stream exhausted from the reservoir 36 is then conveyed to a gas treatment device 40 that removes moisture from the gas stream. This device 40 may be provided by one or more filters, or by a cyclone separator. The gas stream is subsequently conveyed to a device 42 for removing the flammable gas from the gas stream. In this example, this device is a pyrolysis device 42 for pyrolysing the flammable gas and the gaseous oxidant within the gas stream. The pyrolysis device 42 may comprise a pyrolysis catalyst, such as Hopcalite from Molecular Products, which may be at least initially heated by a heater 44 to inhibit the condensation of water within the pyrolysis device. As heat will be generated within the device 42 during the pyrolysis of the flammable gases within the gas stream, the degree of external heating of the device 42 may be gradually reduced or eliminated by a controller 46 during treatment of the gas stream. The pyrolysis device may alternatively comprise a heated high surface area material, or other heated device suitable for performing the pyrolysis. The device 42 may have a gas inlet for receiving a gaseous oxidant for the pyrolysis of the flammable gas, in which case the supply of oxidant to the liquid ring pump may be reduced, or even removed.

In addition to, or as an alternative to, pyrolysis device, a plasma abatement device, combustion apparatus, a gas reactor column or other gas treatment device may be provided for removing a gaseous component from the gas stream exhausted from the liquid ring pump 18. This gaseous component may be a flammable gas, or it may be another gas which is not removed from the gas stream by the liquid within the liquid ring pump, for example a perfluorinated gas such as $CF_4$.

We claim:

1. A method of treating a gas stream comprising first and second gaseous components, the method comprising the steps of:
    conveying the gas stream to a liquid ring pump;
    supplying to the pump a liquid for forming a liquid ring in the pump and for removing the first gaseous component from the gas stream;
    exhausting the liquid and the gas stream from the pump;
    separating the gas stream from the liquid; and
    subsequently removing the second gaseous component from the gas stream,
    wherein a gaseous oxidant is supplied directly to the liquid ring pump so as to mix with the gas stream for reaction with the second gaseous component to remove the second gaseous component from the gas stream.

2. The method according to claim 1, wherein the first gaseous component is an acidic component of the gas stream.

3. The method according to claim 2, wherein the acidic species comprises a sulphur-containing species or a halogen-containing species.

4. The method according to claim 3, wherein the halogen-containing species comprises one of HF, HCl, $BCl_3$, HBr, $Cl_2$ and $Br_2$.

5. The method according to claim 1, wherein the second gaseous component is a flammable gas.

6. The method according to claim 5, wherein the flammable gas comprises one of a hydrocarbon, CO, $H_2$, $NH_3$.

7. The method according to claim 6, wherein the hydrocarbon comprises one of $C_2H_2$, $C_2H_4$, $CH_2F_2$ and $CH_3F$.

8. The method according to claim 1, wherein the second gaseous component is removed from the gas stream by pyrolysis.

9. The method according to claim 5, wherein the flammable gas is pyrolysed using a pyrolysis catalyst.

10. The method according to claim 9, wherein the flammable gas is pyrolysed using a heated device.

11. The method according to claim 1, wherein the gas stream is treated in a plasma abatement device to remove the second gaseous component from the gas stream.

12. The method according to claim 1, wherein the gaseous oxidant comprises oxygen.

13. The method according to claim 12, wherein the gaseous oxidant is supplied to the pump within a stream of air.

14. The method according to claim 1, wherein the liquid comprises water or an aqueous solution.

15. The method according to claim 1, wherein the gas stream is separated from the liquid via a gas treatment device.

16. The method according to claim 15, wherein the gas treatment device comprises one of a filter and a cyclone separator.

17. Apparatus for treating a gas stream containing first and second gaseous components, the apparatus comprising:
    a liquid ring pump for receiving the gas stream;
    means for supplying to the pump a liquid for forming a liquid ring within the pump and for removing the first gaseous component from the gas stream, the pump comprising an outlet for exhausting the liquid and the gas stream from the pump;
    separating means for separating the gas stream from liquid exhausted from the pump;
    means located downstream from the separating means for removing the second gaseous component from the gas stream; and
    means for supplying a gaseous oxidant directly to the liquid ring pump so as to mix with the gas stream for reaction with the second gaseous component in said means for removing the second gaseous component from the gas stream.

18. The apparatus according to claim 17, wherein the means for removing the second gaseous component from the gas stream comprises a pyrolysis device.

19. The apparatus according to claim 18, wherein the pyrolysis device comprises a pyrolysis catalyst.

20. The apparatus according to claim 18, comprising means for heating the pyrolysis device to inhibit the condensation of water therein.

21. The apparatus according to claim 17, wherein the means for removing the second gaseous component from the gas stream comprises a plasma abatement device.

22. The apparatus according to claim 17, comprising means located downstream from the separating means for removing liquid from the gas stream.

23. The apparatus according to claim 22, wherein the means for removing liquid from the gas stream comprises a filter.

24. The apparatus according to claim 22, wherein the means for removing liquid from the gas stream comprises a cyclone.

25. The apparatus according to claim 17, wherein the oxidant supply means is configured to supply a stream of air to the gas stream.

* * * * *